Feb. 10, 1953 R. POLK, SR., ET AL 2,627,884
APPARATUS FOR THE SUPPORT AND SECTIONIZING OF CITRUS FRUIT
Filed June 26, 1950 2 SHEETS—SHEET 1

INVENTORS
RALPH POLK SR.
RALPH POLK JR.

By

Semmes, Keegin, Robinson & Semmes
ATTORNEYS

Feb. 10, 1953 R. POLK, SR., ET AL 2,627,884
APPARATUS FOR THE SUPPORT AND SECTIONIZING OF CITRUS FRUIT
Filed June 26, 1950 2 SHEETS—SHEET 2
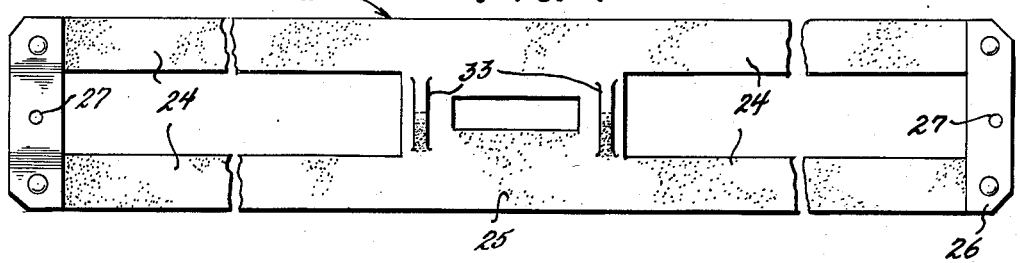
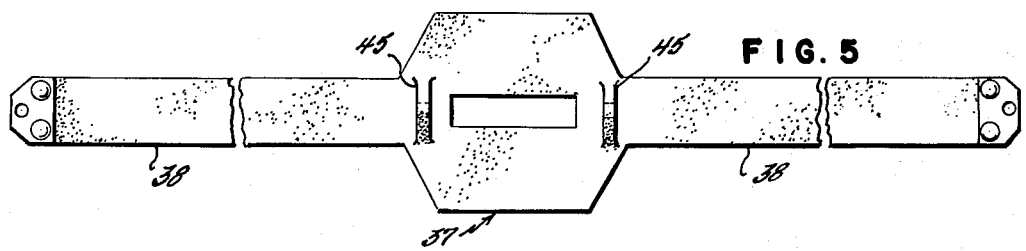
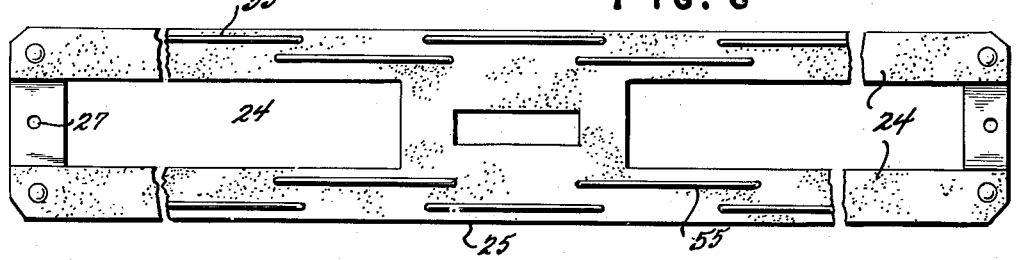
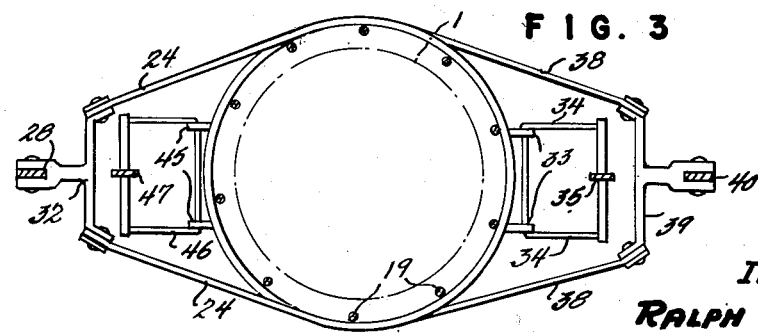
INVENTORS
RALPH POLK SR.
RALPH POLK JR.

Patented Feb. 10, 1953

2,627,884

UNITED STATES PATENT OFFICE 2,627,884

APPARATUS FOR THE SUPPORT AND SECTIONIZING OF CITRUS FRUIT

Ralph Polk, Sr., and Ralph Polk, Jr., Tampa, Fla., assignors to The Polk Development Company, Tampa, Fla., a copartnership of Florida Application June 26, 1950, Serial No. 170,452

5 Claims. (Cl. 146—3)

This invention relates to apparatus for sectionizing citrus fruit and more particularly to supporting the fruit during the sectionizing operation.

In the commercial sectionizing of citrus fruit for canning, the usual procedure is to peel the rind and albedo from the fruit and then pass the peeled fruit through a hot bath of a dilute lye solution. The lye removes the membranes surrounding the outer surface of the peeled fruit but leaves the membranes forming the walls of the sections intact.

After peeling, the fruit is supported on a holding fork which has relatively long tines spaced around the periphery of a circle and adapted to extend substantially completely through the fruit in the apices of a large number of sections. With the fruit supported in this manner, slitting instruments are usually directed along the section walls to part the section walls from the juice sacs comprising the fruit meat. The slitting means may be knives which are inserted polarwise through the fruit just outside of the tines of the fork and then removed radially outward along the section wall in the manner described in the applicants' Patent No. 2,246,896, entitled Apparatus for Sectionizing Citrus Fruits issued on June 24, 1941. Another method for separating the section walls from the juice sacs is described in the applicants' Patent No. 2,489,195. In this latter method, a rotating rod is moved substantially radially outward between the section wall and the adjacent juice sacs to rupture the bond joining those two parts of the fruit. In the usual machinery for sectionizing citrus fruit according to the two methods mentioned, the fruit is moved progressively through a series of stations where various operations on the fruit take place. In some instances, a large number of the bonds joining the section walls with the juice sacs may be ruptured to remove a major portion of the sections and a subsequent spinning operation employed in the manner described in applicants' copending application Serial No. 164,397, filed May 26, 1950, entitled Method of Sectionizing Citrus Fruit.

The outward movement of the slitting means from the apices of a large number of sections through the fruit produces outward forces sufficiently great to tear a large number of section walls. This is particularly true in the sectionizing of mature, late season fruit by automatic machinery. Moreover, the outward movement of the slitting means often breaks an excessive number of sections and thereby lowers the quality of the sectionized fruit.

It is an object of this invention to provide apparatus for supporting citrus fruit as the bond joining the section walls to the juice sacs is ruptured in a manner to minimize the tearing of section walls and breaking of the sections.

Another object of this invention is to provide apparatus for supporting the citrus fruit during the sectionizing operation which does not interfere with the insertion of slitting means into the fruit.

A further object of this invention is to provide apparatus for supporting citrus fruit substantially completely around its periphery during the sectionizing operation.

Still another object of this invention is to provide apparatus which supports the fruit only during the outward movement of the slitting means and is then moved from the periphery of the fruit to facilitate passing the fruit through further processing steps.

It is also an object of this invention to provide apparatus for supporting citrus fruit during a sectionizing operation in which a flexible band is wrapped around the fruit to support it against outward forces of means for slitting the sections from the adjacent section walls.

With these and other objects in view, as will become apparent in the following detailed description, this invention resides in a method and apparatus for wrapping one flexible band around an arc of substantially 180° of the outer periphery of the fruit and another flexible band around the opposite arc and urging the two bands in opposite directions against the fruit to compress the fruit and restrain outward movement thereof during the slitting operation.

In the drawings:

Figure 3 is a plan view of the sling in an open position ready for removal from the fruit;

Figure 4 is a plan view of a preferred modification of one band for the sling;

Figure 5 is a plan view of the second band for the sling adapted and used with the band illustrated in Figure 4; and Figure 6 is a plan view of a modified form of a band corresponding to the band illustrated in Figure 4.

Figure 1:
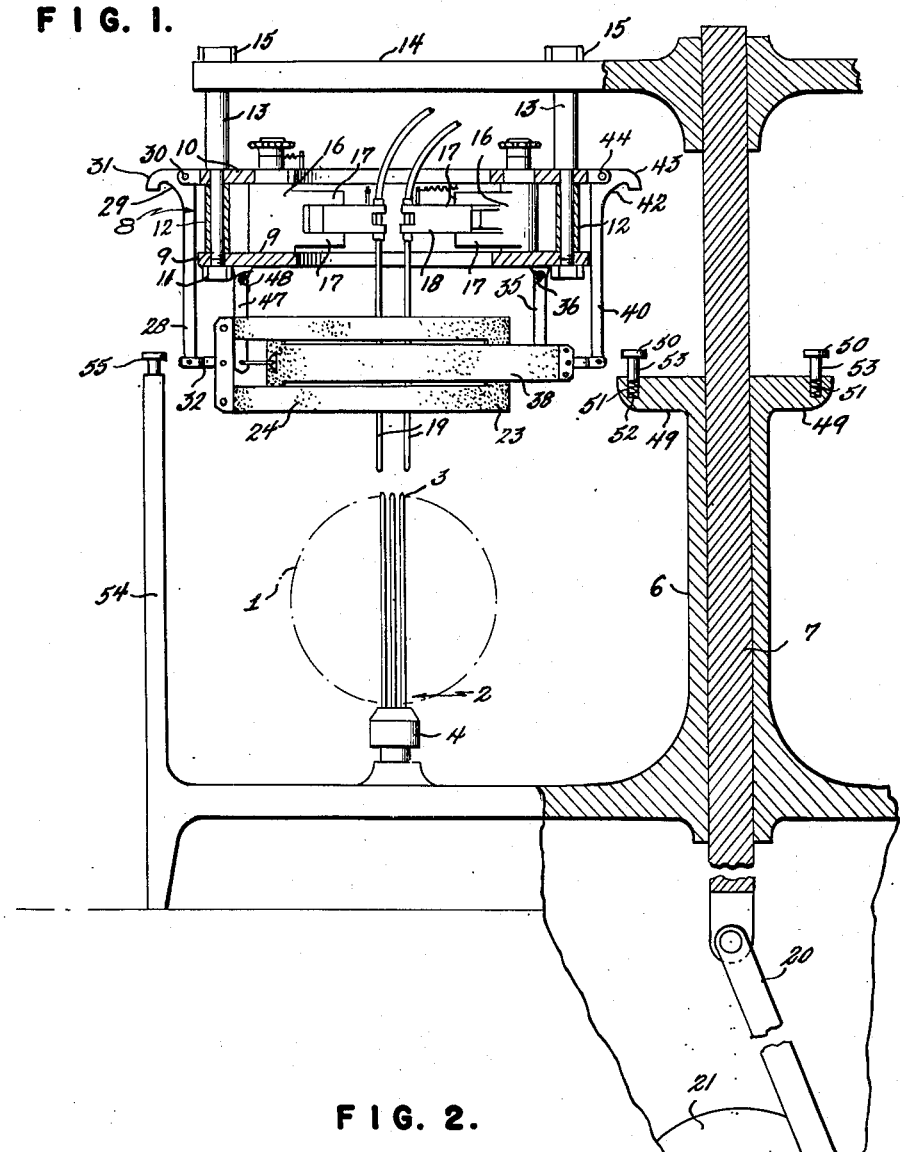
Figure 1 is an elevational view, partially in section, of a preferred form of apparatus for accomplishing the objects of this invention.
Figure 2:
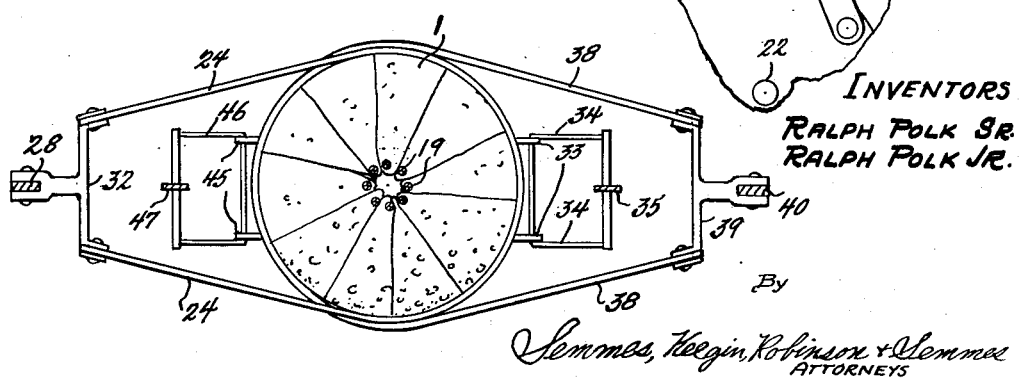
Figure 2 is a plan view of the sling for engaging the citrus fruit in a closed, or fruit supporting, position.

Referring to Figure 1 of the drawings, a citrus fruit 1, indicated by dotted lines, is illustrated on a holding fork, indicated generally by 2, having a plurality of tines 3 extending upwardly through the fruit from a boss 4. The tines 3 are preferably spaced around the periphery of a circle of sufficient diameter that the tines encircle the core of the fruit and extend polarwise through the fruit slightly outside of the apices of the fruit sections. The boss 4 is secured to a supporting arm 5 in a manner to prevent rotation of the fork 2 about its longitudinal axis. The supporting arm 5 extends outwardly from a sleeve 6 surrounding a shaft 7. In the usual installation, the sleeve 6 will be connected for intermittent rotation about the shaft 7 by any conventional means, not shown, such as a Geneva gear mechanism to a number of successive stations at which different operations on the fruit are performed. The shaft 7 is constructed for axial movement within the sleeve 6, but is suitably guided to prevent rotation about its longitudinal axis in order that the fork 2 will be positioned accurately with respect to the shaft for the sectionizing operation hereinafter described.

A head, indicated generally by 8, is mounted directly above the fork 2 for the support of slitting means for separating the sections of fruit from the adjoining section walls. The head 8 consists of a lower annular plate 9 and an upper annular plate 10 held in spaced relationship by collars 12. The collars 12 encircle the lower end of small diameter of a plurality of posts 13 which extend downwardly from a supporting member 14 and are secured thereto by nuts 15. Nuts 11 at the lower end of the posts 13 hold the plates 9 and 10 securely in position. The supporting member 14 is secured to the upper end of the shaft 7 for movement integrally with the shaft in a vertical direction.

The head 8 provides means for supporting the slitting means to be directed along the section walls of the citrus fruit to rupture the bond joining the section walls with the juice sacs. The fruit supporting apparatus of this invention may be used effectively with a number of different types of apparatus for rupturing the bond joining the section walls to the juice sacs of the fruit sections. For instance, slitting means in which knife blades move downward and outward along the section walls might be used. However, for purposes of illustration, slitting means of the type described and claimed in our Patent No. 2,489,195 entitled Method and Apparatus for Sectionizing Citrus Fruit, issued November 22, 1949, has been illustrated. In this apparatus, a plurality of supporting elements 16 are mounted between the plates 9 and 10 on shafts, not shown, for rotation integrally with the shafts. The supporting elements 16 have a pair of spaced fingers 17 extending from their sides and a knuckle 18 pivotally mounted between the fingers 17. The ends of the knuckle 18, remote from the fingers 17, provide support for rotating rods 19 which are directed outward through the fruit to part the juice sacs from the section walls in the manner described in the aforementioned Patent No. 2,489,195.

Longitudinal movement of the shaft 7 within the sleeve 6 to move the head 8 axially with respect to the fork 2 may be accomplished by any means suitable for imparting a reciprocating motion. In the drawings, the shaft 7 is shown with a crank arm 20 connected to its lower end. The lower end of the crank arm 20 is pivotally connected to a fly wheel 21 driven by a shaft 22.

The supporting means of this invention is best illustrated in Figure 1 in which the fruit supporting means is in its elevated position prior to being placed around the fruit for support during the sectionizing operation. The fruit supporting means consists of a sling formed by two flexible bands which wrap around opposite halves of the fruit and exert a restraining force generally opposing the outward force exerted on the fruit by the slitting means. The flexible bands may be made of any material of sufficient flexibility and tensile strength to allow the material to be wrapped around the fruit. Preferably, the bands should be of a dense material relatively impervious to the fruit juices, and, for this reason, rubber is especially suitable. One of the flexible bands, indicated generally by 23 (Figure 4), has a pair of spaced, parallel strips 24 extending from the opposite ends of a center portion 25. The ends of the strips 24 are provided with suitable stiff straps 26 which hold the strips in their spaced relationship. The straps 26 are apertured at 27 for connection with the long arm 28 of a bell crank 29 pivotally supported at 30 from the upper plate 10 of the head 8. A short arm 31 of bell crank 29 extends outwardly beyond the sides of head 8. A yoke 32 joins the lower end of the arm 28 with the straps 26 to hold them in the properly spaced relationship.

The center portion 25 is provided with a pair of loops 33 on the outer surface of the band for connection with one end of struts 34. The struts 34 are connected at their other ends to an arm 35 pivotally mounted on the lower face of plate 9. A torsion spring 36 constantly urges the arm 35 in a counterclockwise direction to urge the center portion of the flexible band 23 away from the fruit 1 and fork 2. In some instances, it may be desirable to replace the struts 34 with a helical spring to aid in obtaining the desired resilient support of the band 23.

A second band 37 of enlarged central area is illustrated in Figure 5 and has a single strip 38, suitably reinforced at its ends, extending from each of two opposite sides of the central portion. The strips 38 are connected at their ends to a yoke 39 which in turn is connected to the lower end of the long arm 40 of a bell crank 42 having a short arm 43 and pivotally suspended from the upper plate 10 at 44. The outer surface of the band 37 is also provided with loops 45 for connection with a pair of struts 46, similar to struts 34. The struts 46 are connected with an arm 47 pivotally mounted on the lower surface of the lower plate 9 and provided with a torsion spring 48 which urges the arm 47 in a clockwise direction.

The arms 28 and 40 connected to the ends of the two flexible bands and the arms 35 and 47 connected to the center portion of the bands combine to support the bands below the lower plate 9 of the head 8 in an open position encircling the slitting rods 19. The central portions of the two bands are positioned on opposite sides of the slitting rods 19 and the strips of each of the bands extend in opposite directions toward the other band and past the slitting rods 19 for connection with the arms 28 and 40. With bands of the type illustrated in the drawings, the strips 38 of band 37 pass through the space between the strips 24 and 38 thereby allowing the bands freedom of movement in opposite directions to support the fruit during this slitting operation in the manner hereinafter described. The yokes 32 and 39 hold the strips in a spaced position and torsion springs 48 and 36 urge the central portions of the two bands away from each other to open the bands and allow them to be slipped over the outer surface of a citrus fruit.

The shape of the bands 23 and 37 is largely a matter of choice. However, it is desirable that they be supported in a manner allowing the tensile forces exerted as the bands are moved to the fruit supporting position to be directed along lines avoiding a tendency to turn the fruit on the fork 2.

Mounted in a shoulder 49 at the upper end of sleeve 6 is a stop 50. The stop 50 should be yieldably mounted for downward movement and may be mounted in a socket 51 in the upper surface of the shoulder 49 and have a compressed helical spring 52 between the lower end of a shank 53 on the stop and the bottom of the socket 51. The stop 50 is positioned directly below the short arm 43 of the bell crank 42 for engagement therewith as the head 8 descends. Similarly, the supporting arm 5 extends beyond the holding fork 2 and is provided with a vertical standard 54 having a stop 55 similar to stop 50 mounted at its upper end. The stop 55 is positioned for engagement with the short arm 31 of the bell crank 29.

In operation, a citrus fruit 1 is placed upon a holder fork 2 with the tines 3 of the fork extending polarwise through the fruit. The placing of the citrus fruit on the fork 2 may be accomplished when the fork is at a different station or at a time when the head 8 is at its uppermost position. When the head 8 is at its upper position, the yokes 39 and 32 and the arms 35 and 47 hold the bands in an open position. In this open position, the bands forming the supporting sling are spaced sufficiently to pass around the outer surface of the citrus fruit as the head 8 descends.

Upon descent of the head 8, the slitting rods 19 are inserted through the fruit near the apices of a number of the sections. When the downward movement of the head 8 is substantially complete, at which time the rods 19 extend substantially completely through the fruit, the short arms 31 and 43 of the bell cranks 29 and 42, respectively, engage the stops 55 and 50. The bell cranks are then rocked to move the ends of the strips on the flexible bands 23 and 37 in opposite directions away from the holding fork 2 and wrap the center portions of each of the bands around opposite half circles of the fruits. Hence the fruit is not compressed during insertion of the slitting rods 19 and insertion of the rods is facilitated.

The great lengths of the arms 40 and 31 as compared with the arms 41 and 43 of the bell cranks provides a quick acting means for moving the ends of the bands in opposite directions to compress the fruit, and, in addition, greatly magnifies the movements of the ends of the bands as compared with the short arms of the bell cranks. Once the slitting rods 19 have passed through the fruit, the movement of the bands against the outer surface of the fruit is quick and positive. The resilient effect of the spring 51 and the stop 50, and the corresponding spring, not shown, in stop 54, is magnified by the bell crank to allow the bands to fit snugly about the fruit without crushing it.

When the slitting rods 19 are moved outwardly along the section walls to rupture the bond between the section walls and the juice sacs and emerge from the outer surface of the fruit, they engage the bands from the supporting sling and urge them against the resilient force of the spring 51 away from the outer surface of the fruit in the manner illustrated in Figure 3. Then when the head 8 is moved vertically upward by the reciprocating means, the sling is spaced from the fruit and is free to move upward without breaking any of the sections of the fruit. As the head 8 continues its upward movement, the rods 19 and sling will return to the position shown in Figure 1.

In a modified form of the invention, the bands forming the sling are provided with strips of metal 56 along their inner surface. The strips prevent the slitting means 18 from tearing or cutting the bands as they emerge from the outer surface of the fruit. However, when the bands are constructed of rubber, the friction between the bands and rods 18 is low once the bands have been wet with fruit juice, and in most instances, the metallic strips will not be necessary.

While the invention has been described with reference to the specific details of the apparatus shown in the drawings, it is to be understood that the inventive concept is not confined to those details of construction, but is defined by the appended claims.

We claim:

1. An apparatus for the sectionizing of citrus fruits in which the fruit is supported on a fork having tines extending through the apices of sections of the fruit, a supporting head, means for moving the supporting head axially with respect to the fork, slitting means supported by the supporting head and adapted to move vertically therewith and penetrate the fruit near the apices of sections as the head moves toward the fork, means for moving the slitting means outwardly along the section walls of the fruit to part the juice sacs therefrom, a sling for the support of the fruit around the outer surface substantially along a great circle perpendicular to the core of the fruit against the outward forces of the slitting means, said sling comprising a pair of flexible bands, supporting means connected to the ends of each band adapted to urge the ends of the bands in opposite directions whereby the bands engage the outer surface of the fruit during the slitting operation, opening means connected to each of the bands near the center thereof, said opening means being resiliently actuated to hold the bands in an open position as the head moves axially towards the fork to space the sling from the fruit for positioning thereon, and quick acting means connected to the supporting means connected to the ends of the bands to overcome the force of the opening means and direct the bands against the fruit on substantial completion of the downward movement of the head.

2. In apparatus for sectionizing citrus fruit in which slitting means are inserted polarwise through the fruit in the region of the apices of the sections and moved outwardly to separate the sections from the section walls, improved means for supporting the fruit against the outward forces exerted by the slitting means comprising a first band and an opposed second band, supporting means attached to the ends of each band and holding the ends of the first band spaced from the ends of the second band, opening means attached to each of the bands near the center thereof and holding the center of the first band away from the ends thereof and the center of the second band away from the ends thereof to form a loop positioned to engage the outer surface of the fruit substantially along a great circle perpendicular to the core of the fruit, and means for activating the supporting means to move the ends of the bands in opposite directions to decrease the opening in the loop whereby the bands engage and support the outer periphery of the fruit as the slitting means move outwardly through the fruit.

3. In apparatus for sectionizing citrus fruit in which slitting means are inserted polarwise through the fruit in the region of the apices of the sections and moved outwardly to separate the sections from the section walls, improved means for supporting the fruit against the outward forces exerted by the slitting means comprising a first band and an opposed second band, supporting means attached to the ends of each band and holding the ends of the first band spaced from the ends of the second band, movable opening means attached to each of the bands near the center thereof constructed and arranged to hold the center of the first band away from the ends thereof and the center of the second band away from the ends thereof to form a loop positioned to engage the outer surface of the fruit substantially along a great circle of the fruit perpendicular to its core, said movable opening means being spring actuated to urge the centers of the two bands apart and thereby open the loop for the reception of fruit, and means for activating the supporting means to move the ends of the bands in opposite directions to decrease the opening in the loop whereby the bands engage and support the outer periphery of the fruit as the slitting means move outwardly through the fruit.

4. In apparatus for sectionizing citrus fruit in which slitting means are inserted polarwise through the fruit in the region of the apices of the sections and moved outwardly to separate the sections from the section walls, improved means for supporting the fruit against the outward forces exerted by the slitting means comprising a first band and an opposed second band, quick acting supporting means attached to the ends of each band and holding the ends of the first band spaced from the ends of the second band, movable opening means attached to each of the bands near the center thereof constructed and arranged to hold the center of the first band away from the ends thereof and the center of the second band away from the ends thereof to form a loop positioned to engage the outer surface of the fruit substantially along a great circle of the fruit perpendicular to its core, said movable opening means being spring actuated to urge the centers of the two bands apart and thereby open the loop for the reception of fruit, and means for activating the supporting means to move the ends of the bands in opposite directions to decrease the opening in the loop whereby the bands engage and support the outer periphery of the fruit as the slitting means move outwardly through the fruit.

5. In apparatus for sectionizing citrus fruit in which slitting means are inserted polarwise through the fruit in the region of the apices of the sections and moved outwardly to separate the sections from the section walls, improved means for supporting the fruit against the outward movement of the slitting means comprising a first band and a second band interlocking therewith, the ends of the first and second bands extending in opposite directions, a bell crank having a relatively long arm connected to both ends of the first band, a second bell crank having a relatively long arm connected to the ends of the second band, each of said bell cranks having a relatively short arm, spring actuated opening means attached to each of the bands near the center thereof and urging the center of the respective bands away from their ends to form a loop positioned to encircle the fruit, and means for engaging the short arm of the bell crank substantially at completion of the movement of the slitting means polarwise through the fruit to move the ends of the bands in opposite directions and thereby tighten the loop around the fruit as the slitting means move outwardly through the fruit.

RALPH POLK, Sr.
RALPH POLK, Jr.

REFERENCES CITED

The following references are of record in the file of this patent:

UNITED STATES PATENTS

| Number | Name | Date |
| --- | --- | --- |
| 1,644,755 | Stephenson | Oct. 11, 1927 |
| 2,129,101 | Polk, Jr. | Sept. 6, 1938 |
| 2,215,016 | Sammons | Sept. 17, 1940 |
| 2,489,195 | Polk, Sr. et al. | Nov. 22, 1949 |